(12) United States Patent
Hunt

(10) Patent No.: US 6,234,560 B1
(45) Date of Patent: May 22, 2001

(54) CARGO COVER

(75) Inventor: Robert M. Hunt, Bingham Farms, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/373,640

(22) Filed: Aug. 13, 1999

(51) Int. Cl.[7] .................................................... B60P 7/02
(52) U.S. Cl. ............................. 296/100.11; 296/100.03; 296/100.04; 296/100.07
(58) Field of Search ..................... 296/100.02, 100.03, 296/100.04, 100.06, 100.07, 100.11

(56) References Cited

U.S. PATENT DOCUMENTS

| | | | |
|---|---|---|---|
| 3,165,352 | * 1/1965 | Hallock et al. | 296/100.04 |
| 3,291,520 | 12/1966 | Smith | 296/24 |
| 3,342,523 | * 9/1967 | Lutgen | 296/100.04 |
| 3,578,378 | * 5/1971 | Anderson | 296/100.04 |
| 3,762,763 | * 10/1973 | Deshores | 296/100.04 |
| 4,068,886 | * 1/1978 | Gostomski | 296/100.04 |
| 4,741,570 | * 5/1988 | Lovaas | 296/100.04 |
| 4,770,461 | * 9/1988 | Lovaas | 296/100.04 |
| 4,783,112 | * 11/1988 | Lovaas | 296/100.04 |
| 4,789,197 | * 12/1988 | Lewis | 296/100.04 |
| 4,813,735 | * 3/1989 | Avitable | 296/100.02 |
| 4,909,561 | * 3/1990 | Lovaas | 296/100.04 |
| 4,974,898 | * 12/1990 | Baranski | 296/100.03 |
| 5,067,766 | * 11/1991 | Lovaas | 296/100.04 |
| 5,415,506 | 5/1995 | Payne | 410/129 |
| 5,655,809 | * 8/1997 | Hutchinson | 296/100.03 |

OTHER PUBLICATIONS

U.S. patent application Ser. No. 09/237,337 filed Jan. 26, 1999 entitled "Adaptable Pick Up Truck Configuration".

US Patent Application, Attorney Docket No. H–204033 mailed Jun. 8, 1999 entitled "Re–Configurable Cargo Cover".

UltraHatch Brochure—1 page No Date.

Rugged Liner Borchure—1 page No Date.

\* cited by examiner

Primary Examiner—D. Glenn Dayoan
Assistant Examiner—Kiran B. Patel
(74) Attorney, Agent, or Firm—Jeffrey A Sedlar

(57) ABSTRACT

A cargo cover for a bed of a vehicle. The cargo cover includes a plurality of individual panels to cover the cargo area of the bed of a vehicle and a pair of side frames connected to sides of the bed of the vehicle. The cargo cover also includes a pair of side rails operatively cooperating with the panels and the side frames to allow the panels to slide relative to each other to open and close the cargo area of the bed of the vehicle.

17 Claims, 3 Drawing Sheets

CARGO COVER

TECHNICAL FIELD

The present invention relates generally to cargo covers for vehicles and, more particularly, to a cargo cover for a bed of a vehicle.

BACKGROUND OF THE INVENTION

It is known to provide a bed for a vehicle such as a sport utility vehicle and a pick-up truck. Typically, the bed is rectangular in shape to define a cargo area and is closed at the end by a tailgate. The tailgate is hinged to the bed to have an upright position to close the end of the bed and a down position to open the end of the bed.

Many of the pick-up trucks sold today have a cargo cover to cover the bed. The cargo cover is made as a one-piece panel of a relatively "strong/rigid" hard material to withstand predetermined strength and performance specifications. The cargo cover will only fit the bed for which it was designed.

Some pick-up trucks may include two or more rows of seats such as a crew/club or extended cabs and a cargo box or bed behind the cab that is structurally integral with the cab. The lower part of the rear of the cab may be opened and the rearmost seats folded to allow the cargo area to extend forward under the rear cab window into the occupant compartment. The forward part of the cargo area may be a "tub", open to the rear that may be slid forward to make the forward extension of the cargo area.

Although the above has worked well, it is desirable to provide a versatile cargo cover for this cargo box and sliding tub. It is also desirable to provide a cargo cover which can provide security for the cargo, the cargo and occupant area when the cargo box is extended, or the occupant compartment alone when the cargo box is extended. Therefore, there is a need in the art to provide a cargo cover for the cargo area of a bed for a vehicle.

SUMMARY OF THE INVENTION

It is, therefore, one object of the present invention to provide a cargo cover for a bed of a vehicle.

It is another object to provide a cargo cover for a cargo box and sliding tub for a bed of a vehicle.

It is yet another object of the present invention to provide a cargo cover for a cargo area of a bed of a vehicle.

To achieve the foregoing objects, the present invention is a cargo cover for a bed of a vehicle. The cargo cover includes a plurality of individual panels to cover the cargo area of the bed of a vehicle and a pair of side frames connected to sides of the bed of the vehicle. The cargo cover also includes a pair of side rails operatively cooperating with the panels and the side frames to allow the panels to slide relative to each other to open and close the cargo area of the bed of the vehicle.

One advantage of the present invention is that a cargo cover is provided for a bed of a vehicle. Another advantage of the present invention is that the cargo cover provides a "maximum occupant" and "maximum cargo" configuration for a bed of a vehicle. Yet another advantage of the present invention is that the cargo cover may cover and secure the cargo, be used to seal the occupant area for occupant security, and the cargo area may be opened to carry large objects without the need to remove the cargo cover from the vehicle. Still another advantage of the present invention is that the cargo cover offers occupant-carrying capability, overall length and maneuverability of a vehicle, with convertibility into the load-carrying length and height of a pickup, and with a variety of ways to configure the cargo area. A further advantage of the present invention is that the cargo cover offers a high degree of flexibility to the vehicle because the cargo area may be open or closed in he maximum occupant and maximum cargo configurations.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
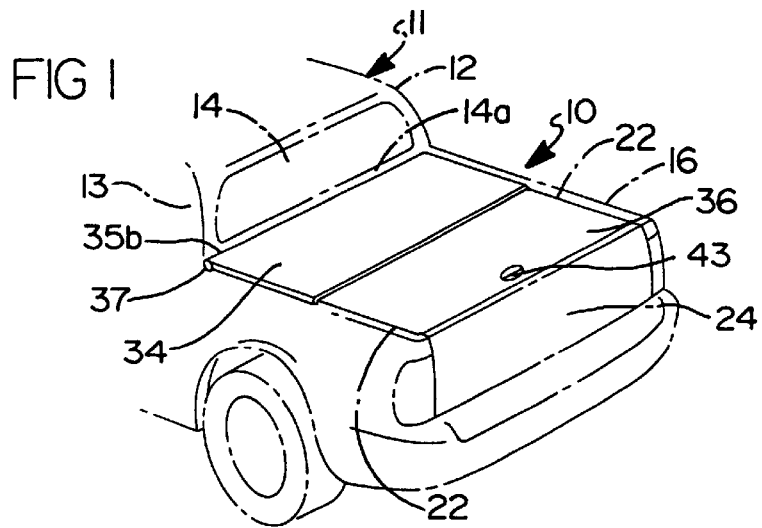
FIG. 1 is a perspective view of a cargo cover, according to the present invention, illustrated in a secured position with a bed of a vehicle.

Referring to the drawings and in particular FIGS. 1 through 6, one embodiment of a cargo cover 10, according to the present invention, is shown for a vehicle such as a pick-up truck, generally indicated at 11. Such pick-up trucks 11 typically include a cab 12 (partially shown) forming an occupant compartment 13. The cab 12 includes two or more rows of seats (not shown) disposed in the occupant compartment 13. The cab 12 includes a rear cab window 14 at a rear longitudinal end thereof and a crossbeam 14a extending laterally beneath the rear cab window 14. The cab 12 includes a lower opening 15 beneath the crossbeam 14a for a function to be described.

The pick-up truck 11 also includes a cargo box or bed 16 forming a cargo area 18. The bed 16 includes a floor 20, two sides 22 and a tailgate 24 that define the cargo area 18. The pick-up truck 11 may include a bed liner or tub 25 that has a generally box shape which is open to a top and rear thereof. The tub 25 has a floor wall 25a and a front wall 25b and side walls (not shown) generally perpendicular to the floor wall 25a. The tub 25 may be slid forward to make a forward extension of the cargo area 18. It should be appreciated that the bed 16 is structurally integral with the cab 14. It should also be appreciated that the rearmost row of seats may be folded to allow the cargo area 18 to extend forward under the rear cab window 14 into the occupant compartment 13. It should also be appreciated that, except for the cargo cover 10, the pick-up truck 12 is conventional and known in the art.

Referring to FIGS. 1 through 10, the cargo cover 10 includes a plurality of, preferably two, side frames 26 that are attached to the sides 22 of the bed 16 by suitable means such as fasteners (not shown). The side frames 26 extend longitudinally and are generally "U" shaped in cross-section to form a channel 28. The side frames 26 are made of a rigid material such as metal. It should be appreciated that the side frames 26 are fixed to the bed 16 of the vehicle 12. It should also be appreciated that the side frames 26 may be attached to sides of the tub 25 disposed in the cargo area 18.

The cargo cover 10 also includes a plurality of, preferably two, side rails 30 that are disposed in the channel 28 of the side frames 26 and slideable therein. The side rails 30 extend longitudinally and are generally "C" shaped in cross-section. The side rails 30 each have a flange 32 extending upwardly from a lower portion thereof to form a generally "U" shaped channel 33 for a function to be described. The side rails 30 are made of a rigid material such as metal.

The cargo cover 10 further includes individual first and second panels 34 and 36, respectively, to cover the cargo area 18 of the bed 16. The first and second panels 34 and 36 are generally rectangular in shape and made of a relatively rigid material such as plastic to withstand predetermined strength and performance specifications. The first and second panels 34 and 36 have the same width. The first panel 34 has a longitudinal length greater than the second panel 36.

The first panel 34 is disposed near the cab 14 and has a recess 35a along each side to receive the side rails 30. The first panel 34 is fixed to the side rails 30 by suitable means such as fasteners (not shown). The first panel 34 also has a forward edge 35b pivotally connected or hinged to the side frames 26 by suitable means such as a hinge 37. The first panel 34 has a rear edge 38 that extends downwardly and generally perpendicular thereto for a function to be described.

The second panel 36 has a side edge 40 along each side thereof which extends downwardly and generally perpendicular thereto. The side edges 40 are disposed in the channel 33 of the side rails 30. The second panel 36 also has a forward edge 42 which extends upwardly and generally perpendicular thereto. The forward edge 42 is disposed forward of the rear edge 38 of the first panel 34. The rear edge 38 of the first panel 34 and forward edge 42 of the second panel 36 overlap to form a seal for sealing a joint between the panels 34 and 36 when the cargo cover 10 is fully extended. The second panel 36 may also include a lock 43 to secure the second panel 36 and cargo cover 10 to the sides 22 of the bed 16. It should be appreciated that the lock 43 is conventional and known in the art.

Figure 9:
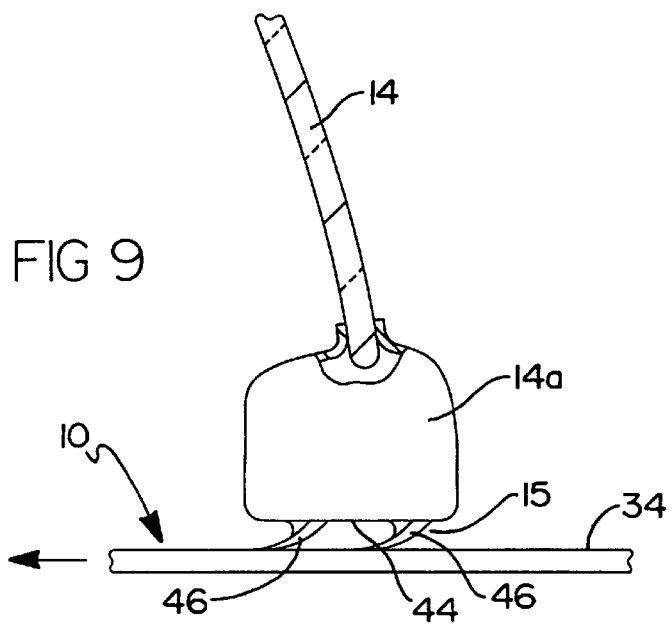
FIG. 9 is a fragmentary elevational view of the cargo cover and vehicle of FIG. 1.

Referring to FIG. 9, the cargo cover 10 may include a seal 44 between the crossbeam 14a for the cab rear window 14 of the cab 12 and the cargo cover 10. The seal 44 has at least one, preferably a pair of wipers 46 to form a double wiping seal with drainage between the wipers 46. It should be appreciated that the panels 34 and 36 for the cargo cover 10 are sealed when the panels 34 and 36 are slid forward under the rear cab window 14.

Figure 2:
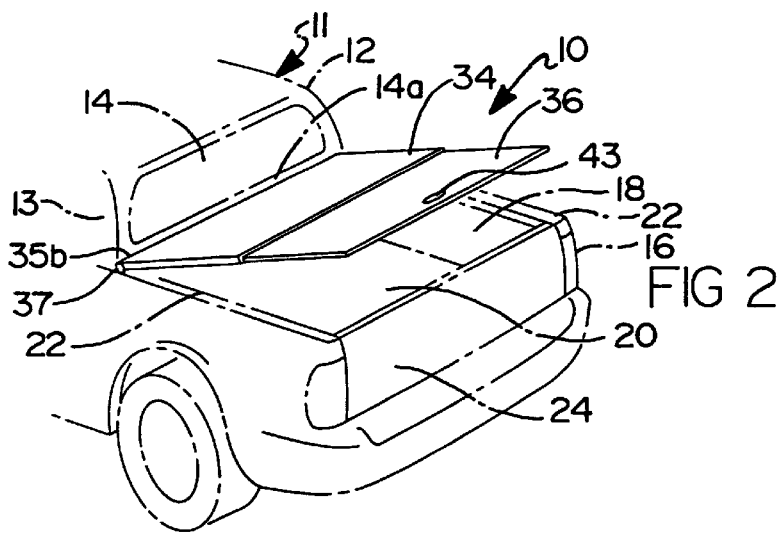
FIG. 2 is a perspective view of the cargo cover and vehicle of FIG. 1 illustrating a lifted position for loading.

As illustrated in FIG. 1, the cargo cover 10 is installed in a secured position to cover the cargo area 18. In this position, the panels 34 and 36 of the cargo cover 10 form a lockable hard cover that protects cargo in the cargo area 18. The cargo cover 10 can be unlocked via the lock 43 and lifted and rotated up from a forward edge 35b of the first panel 34 via the hinges 37 to provide access to the cargo area 18 for loading as illustrated in FIG. 2. It should be appreciated that the side rails 30 allow the second panel 36 to slide under the first panel 34. It should also be appreciated that a support or assist device (not shown) could be provided to hold the cargo cover in the raised position.

Figure 3:
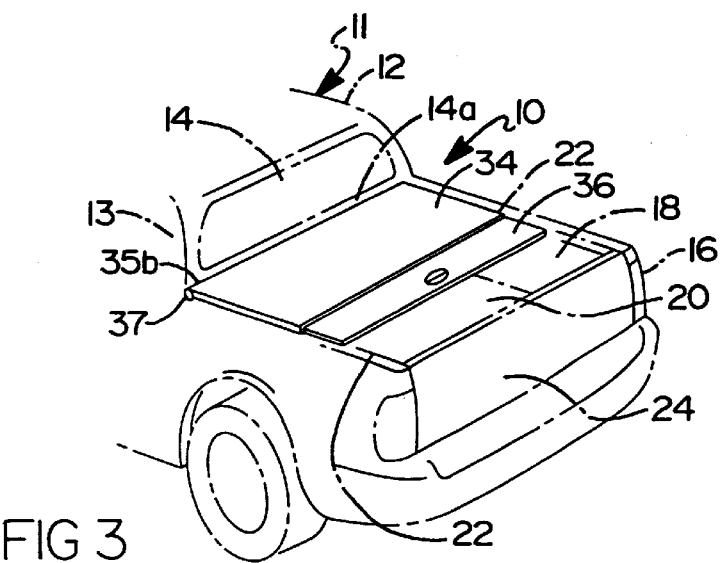
FIG. 3 is a perspective view of the cargo cover and vehicle of FIG. 1 illustrating a slid open position for loading.

Referring to FIG. 3, the cargo cover 10 is installed and unlocked via the lock 43 to allow the second panel 36 to be slid forward via the side rails 30 to open the cargo area 18 for loading objects into the cargo area 18 of the bed 16.

Figure 4:
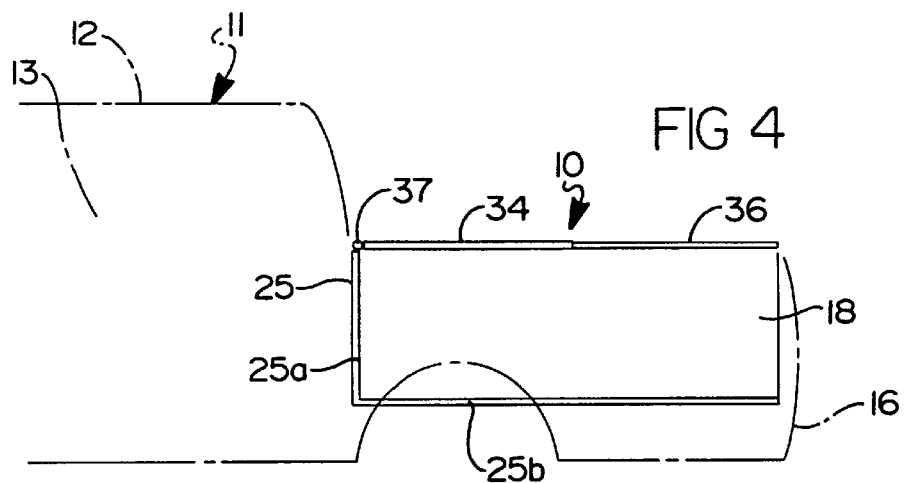
FIG. 4 is an elevational view of the cargo cover and vehicle of FIG. 1 illustrating a maximum occupant position.
Figure 5:
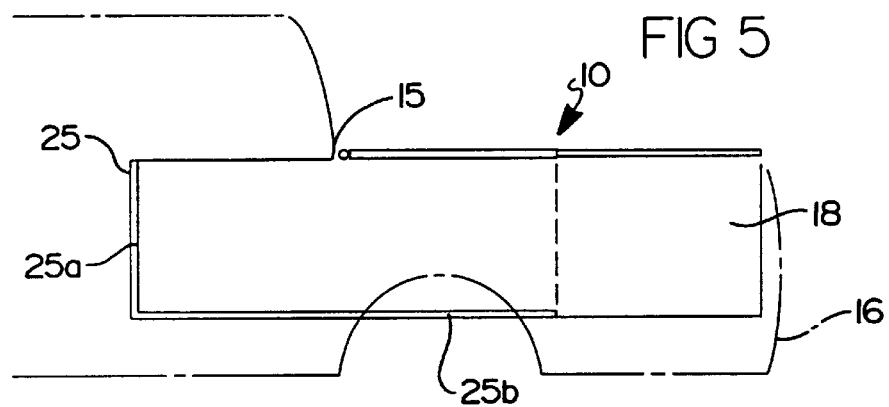
FIG. 5 is an elevational view of the cargo cover and vehicle of FIG. 1 illustrating a maximum cargo position.
Figure 6:
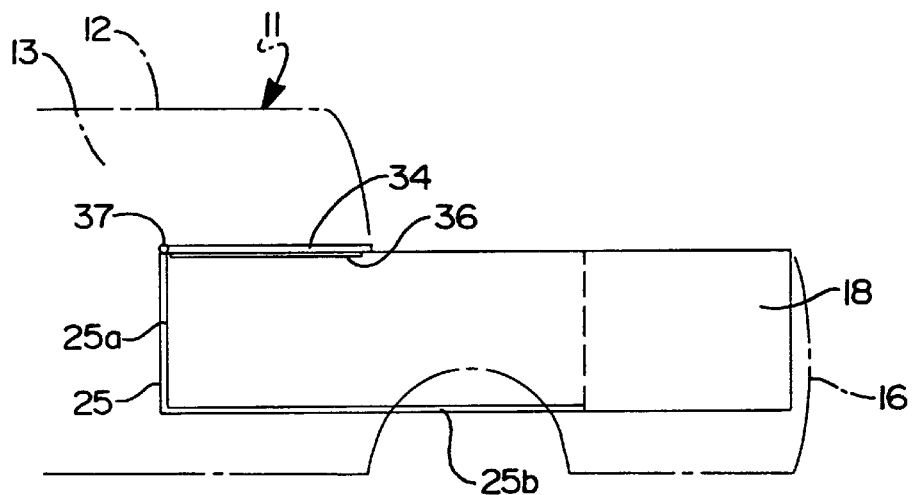
FIG. 6 is an elevational view of the cargo cover and vehicle of FIG. 1 illustrating a maximum cargo position.
Figure 7:
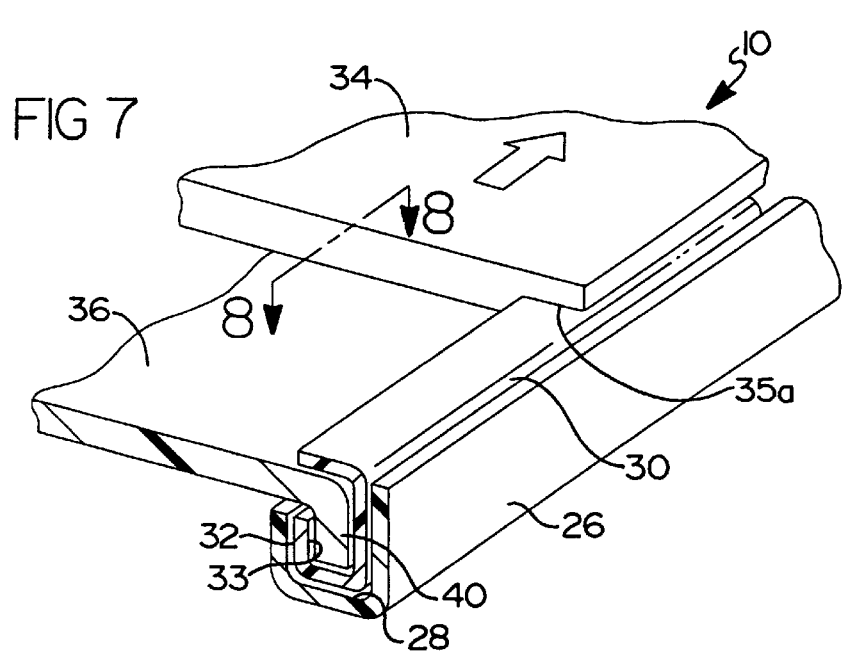
FIG. 7 is a perspective view of a portion of the cargo cover and vehicle of FIG. 1.
Figure 8:
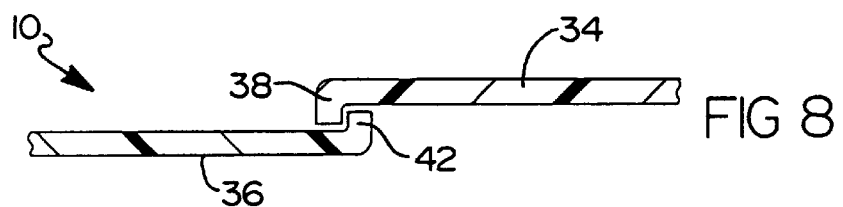
FIG. 8 is a sectional view taken along line 8—8 of FIG. 7.

As illustrated in FIG. 4, the cargo cover 10 is installed to cover the cargo area 18 and the tub 25 is in its most rearward position for a maximum occupant area, enabling the rearmost row of seats in the cab 12 to be used for occupants. In this position, the cargo area 18 is covered and secure. As illustrated in FIG. 5, the rearmost seat area is reconfigured and the tub 25 is slid forward in its most forward position for a maximum cargo area. In this position, the cargo area 18 is covered and the occupant compartment 13 is protected from the outside weather conditions. As illustrated in FIG. 6, the cargo cover 10 is slid forward so that the first panel 34 covers the tub 25 between its front wall 25a and the rear cab window 14. The second panel 36 is slid under the first panel 34. In this position, the cargo area 18 is open behind the rear cab window 14 while the occupant compartment 13 remains sealed from the outside environment. It should be appreciated that another second panel (not shown) could be added when the length of the unextended cargo area 18 is greater than twice the length of the first panel 34. It should also be appreciated that the cargo cover 10 may be removed from the hinges 37 and taken off the pick-up truck 12 if desired.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cargo cover comprising:

a plurality of individual panels adapted to cover a cargo area of a bed of a vehicle;

a pair of side frames for connection to sides of the bed and each having a first channel extending therealong; and a pair of side rails being disposed in said first channel of said side frames and slidable therein and each having a second channel extending therealong for operatively cooperating with said panels, a forward one of said panels being fixed to said side rails and rear ones of said panels having a side edge along each side thereof that extends downwardly and is disposed and slidable in said second channel to allow said panels to slide to open and close the cargo area.

2. A cargo cover as set forth in claim 1 wherein said panels comprise a first panel and a second panel.

3. A cargo cover as set forth in claim 2 wherein said first panel has a longitudinal length greater than a longitudinal length of said second panel.

4. A cargo cover as set forth in claim 2 wherein said second panel has a lock to lock said cargo cover to the bed of the vehicle.

5. A cargo cover as set forth in claim 2 wherein said first panel and said second panel are generally rectangular in shape.

6. A cargo cover as set forth in claim 2 wherein said first panel has a rear edge extending downwardly and said second panel has a forward edge extending upwardly, said rear edge overlapping said forward edge to form a seal therebetween.

7. A cargo cover as set forth in claim 2 including a hinge to pivotally connect said first panel to said side frames.

8. A cargo cover assembly comprising:
- a tub having a generally box shape and being open to a top and rear thereof and to be disposed and slidable in a bed of a vehicle to define a forward extension of a cargo area therein;
- a first panel and second panel adapted to cover the cargo area;
- a pair of side frames for connection to sides of the bed; and
- a pair of side rails operatively cooperating with said first panel and said second panel and said side frames to allow said first panel and said second panel to slide to open and close the cargo area.

9. A cargo cover assembly as set forth in claim 8 wherein said second panel has a lock to lock said cargo cover to the bed of the vehicle.

10. A cargo cover assembly as set forth in claim 8 wherein said first panel has a longitudinal length greater than a longitudinal length of said second panel.

11. A cargo cover assembly as set forth in claim 10 wherein said first panel has a rear edge extending downwardly and said second panel has a forward edge extending upwardly, said rear edge overlapping said forward edge to form a seal therebetween.

12. A cargo cover assembly as set forth in claim 8 wherein said first panel and second panel are generally rectangular in shape.

13. A cargo cover assembly as set forth in claim 8 including a hinge to pivotally connect said first panel to said side frames.

14. A cargo cover assembly as set forth in claim 8 wherein each of said side rails has a channel, said first panel being fixed to said side rails.

15. A cargo cover assembly as set forth in claim 14 wherein said second panel has a side edge extending downwardly and being disposed in said channel.

16. A cargo cover assembly as set forth in claim 8 wherein said side frames have a channel, said side rails being disposed in said channel.

17. A cargo cover assembly comprising:
- a tub having a generally box shape and being open to a top and rear thereof and to be disposed and slidable in a bed of a pick-up truck to define a forward extension of a cargo area therein;
- a generally rectangular first panel and a generally rectangular second panel adapted to cover the cargo area, wherein said first panel has a longitudinal length greater than a longitudinal length of said second panel, said first panel adapted to be disposed adjacent a cab of the pick-up truck and having a rear edge that extends downwardly, said second panel having a forward edge that extends upwardly, said forward edge being disposed forward of said rear edge and overlapping to form a seal for sealing a joint between said first panel and said second panel when said first panel and said second panel are fully extended;
- a pair of side frames for connection to sides of the bed and each having a first channel extending therealong; and
- a pair of side rails disposed in said first channel of said side frames and slidable therein and said side rails each having a second channel extending therealong, said first panel having a recess along each side thereof to receive said side rails and being fixed to said side rails and a forward edge being pivotally connected to said side frames, and said second panel having a side edge along each side thereof that extends downwardly and is disposed and slidable in said second channel of said side rails to allow said first panel and said second panel to slide to open and close the cargo area.

* * * * *